(12) United States Patent
Rahman

(10) Patent No.: US 8,760,999 B2
(45) Date of Patent: Jun. 24, 2014

(54) CORE NETWORK DISASTER RECOVERY ARCHITECTURE

(75) Inventor: Moshiur Rahman, Marlboro, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 820 days.

(21) Appl. No.: 12/569,233

(22) Filed: Sep. 29, 2009

(65) Prior Publication Data

US 2011/0075553 A1    Mar. 31, 2011

(51) Int. Cl.
*H04L 12/26* (2006.01)
(52) U.S. Cl.
USPC .......................................... 370/218; 370/221
(58) Field of Classification Search
USPC .............. 370/216–218, 351, 389, 395.5, 400, 370/401
See application file for complete search history.

(56) References Cited

U.S. PATENT DOCUMENTS

| | | | |
|---|---|---|---|
| 7,174,389 B2 * | 2/2007 | Orava et al. ................... | 709/239 |
| 2001/0018342 A1 * | 8/2001 | Vialen et al. .................. | 455/423 |
| 2001/0034228 A1 * | 10/2001 | Lehtovirta et al. ............ | 455/424 |
| 2005/0165960 A1 * | 7/2005 | Orava et al. ................... | 709/239 |
| 2006/0126495 A1 * | 6/2006 | Guichard et al. ............. | 370/216 |
| 2006/0276192 A1 * | 12/2006 | Dutta et al. ................... | 455/436 |
| 2007/0118604 A1 * | 5/2007 | Costa Requena ............. | 709/206 |
| 2007/0211694 A1 * | 9/2007 | Rasanen ........................ | 370/352 |
| 2008/0161054 A1 * | 7/2008 | Kallio et al. .................. | 455/560 |
| 2009/0046655 A1 * | 2/2009 | Zhao et al. .................... | 370/331 |
| 2010/0027533 A1 * | 2/2010 | Kant et al. .................... | 370/355 |
| 2010/0267365 A1 * | 10/2010 | Wang et al. ................... | 455/411 |

* cited by examiner

*Primary Examiner* — Edan Orgad
*Assistant Examiner* — Curtis A Alia
(74) *Attorney, Agent, or Firm* — Amin, Turocy & Watson, LLP

(57) ABSTRACT

System(s), method(s), and device(s) that enable recovery of a core network (e.g., UMTS, GSM) during a disaster or other disruption are presented. A service recovery controller component can monitor connectivity in the communication network, can detect a disruption or loss of connectivity in the packet-switched (PS) core network, and, when a disruption or loss of connectivity is detected, can automatically re-route data or voice traffic between a radio network controller(s) and an internet protocol (IP) multimedia subsystem (IMS) core network via a direct interface(s) to enable communications to continue between communication devices. The service recovery controller component can continue to monitor connectivity in the communication network, and can detect when connectivity is re-established with the PS core network. When connectivity is re-established, the service recovery controller component can route data or voice traffic via the PS core network.

20 Claims, 7 Drawing Sheets

US 8,760,999 B2

CORE NETWORK DISASTER RECOVERY ARCHITECTURE

TECHNICAL FIELD

The subject innovation generally relates to wireless communications, and, more particularly, to recovery of a core network during a disaster or other disruption of access to the core network.

BACKGROUND

Many wireless communication devices (e.g., mobile phones, laptop computers, etc.) have the ability to access the internet to receive data from or send data to other communication devices. It is desirable to maintain communication between communication devices even when there is a disruption in connectivity associated with a portion of the communication network.

Conventionally, a communication device (e.g., cellular phone; computer, etc.) can be associated with a radio network subsystem (RNS), comprising one or more base stations associated with one or more radio network controllers (RNCs). The RNS also can be associated (e.g., connected) with a packet-switched (PS) core network, which can be associated (e.g., connected) with an Internet Protocol (IP) Multimedia System (IMS) core network to facilitate communications between the IMS core network and the communication device. In certain instances, there can be a disruption or loss of connectivity between the PS core network and the IMS core network, and/or between the RNS and PS core network, which can result in loss of communications between the communication device and the IMS core network. It is desirable to be able to recover and maintain communications between communication devices in the communication network when there is a disruption or loss of connectivity with the PS core network.

SUMMARY

The following presents a simplified summary of the innovation in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The subject innovation provides systems, methods, and devices that enable recovery of connectivity and communications with a core network, such as an internet protocol (IP) multimedia subsystem (IMS) core network (e.g., in an Universal Mobile Telecommunications System (UMTS), in a Global System for Mobile communications (GSM)), during a disruption of service in a packet-switched (PS) core network (e.g., disaster causes disruption of service by the PS core network). In accordance with various aspects and embodiments, the subject innovation can comprise a service recovery controller component (SRCC) that can monitor connectivity in the communication network and can detect a disruption or loss of connectivity associated with the PS core network. When a disruption or loss of connectivity relating to the PS core network is detected, the SRCC can automatically and/or dynamically re-route data or voice traffic between a radio network controller(s) (RNC(s)), associated with a radio access network (RAN) (e.g., Universal Terrestrial RAN (UT-RAN)), and the IMS core network via a direct interface(s) to enable communications to continue between communication devices, even though connectivity with the PS core network has been lost or disrupted. For example, there can be a wireless or wired direct interface between an RNC and a Call State Control Function (CSCF) in the IMS core network; and/or there can be a wireless or wired direct interface between another RNC and a Media Gateway (MGW) in the IMS core network. In another aspect, the SRCC can continue to monitor connectivity status in the communication network, and can detect when connectivity is re-established with the PS core network. When connectivity is re-established, the SRCC can again route data or voice traffic via the PS core network.

In accordance with various other aspects and embodiments, methods that enable recovery of a PS core network during a disruption of service in the PS core network are presented; and devices that enable recovery of a PS core network during a disruption of service in the PS core network are presented.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention may be employed. Other aspects, advantages and novel features of the invention will become apparent from the following detailed description of the invention when considered in conjunction with the drawings.

DETAILED DESCRIPTION

Figure 1:
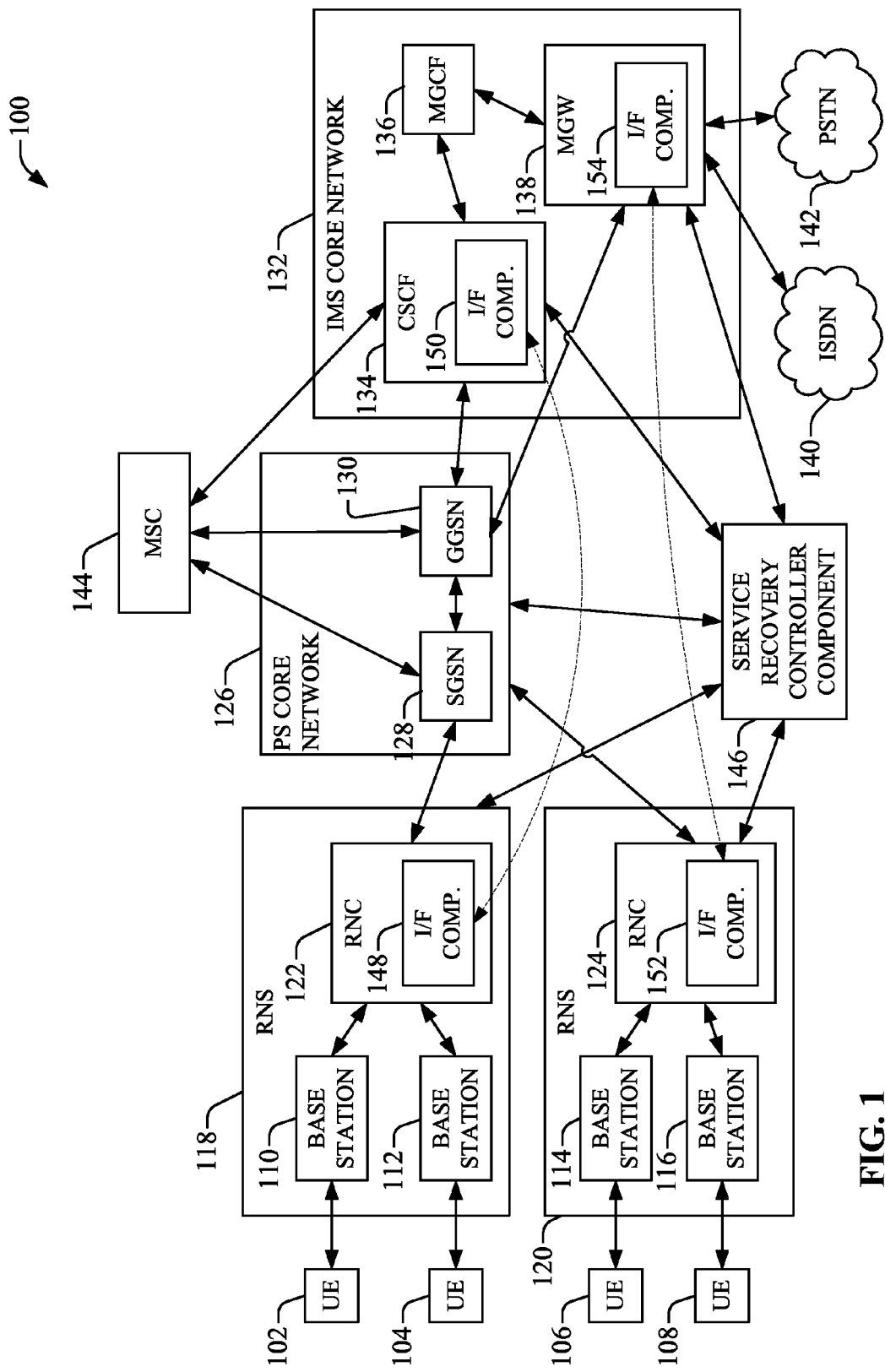
FIG. 1 is a block diagram of an example system that can recover and maintain connectivity between a radio network subsystem(s) (RNS(s)) and an Internet Protocol (IP) Multimedia Subsystem (IMS) core network during disruption of connectivity associated with a PS core network in a communication network in accordance with an embodiment of the disclosed subject matter.

The subject innovation is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component," "system," "platform," and the like can refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment," "mobile station," "mobile," "subscriber station," "communication device," "access terminal," "terminal," "handset," and similar terminology, refer to a wireless device (e.g., cellular phone, smart phone, computer, personal digital assistant (PDA), set top box, Internet Protocol Television (IPTV), etc.) utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "home Node B (HNB)," and the like, are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows.

Furthermore, the terms "user," "subscriber," "customer," and the like are employed interchangeably throughout the subject specification, unless context warrants particular distinction(s) among the terms.

The following abbreviations are relevant to the subject specification.

3G Third Generation
3GPP Third Generation Partnership Project
AGPS Assisted GPS
AP Access Point
ADSL Asymmetric Digital Subscriber Line
AWS Advanced Wireless Services
BRAS Broadband Remote Access Server
BTA Basic Trading Area
CN Core Network
CS Circuit-Switched
CSCF Call Session Control Function
CPE Customer Premise Equipment
CPN Customer Premise Network
DHCP Dynamic Host Configuration Protocol
DSL Digital Subscriber Line
DSLAM Digital Subscriber Line Access Multiplexer
E911 Enhanced 911
FCC Federal Communications Commission
FL Forward Link
GGSN Gateway GPRS Service Node
GPRS General Packet Radio Service
GPS Global Positioning System
GW Gateway
HAP Home Access Point
HSS Home Subscriber Server
ISDN Integrated Services Digital Network
UE User Equipment
UTRAN Universal Terrestrial Radio Access Network
IMS IP Multimedia Subsystem
IP Internet Protocol
ISP Internet Service Provider
MSA Metropolitan Statistical Areas
MSISDN Mobile Subscriber ISDN Number
MTA Major Trading Areas
NAT Network Address Translation
NTP Network Time Protocol
O&M Operation and Maintenance
PC Personal Computer
PCS Personal Communications Service
PS Packet-Switched
PSTN Public Switched Telephone Network
RAN Radio Access Network
RBS Radio Base Station
RL Reverse Link
RNC Radio Network Controller
RSA Rural Service Area
SGSN Serving GPRS Support Node
SIP Session Initiation Protocol
USSD Unstructured Supplementary Service Data
VPN Virtual Private Network
WAP Wireless Application Protocol
XDSL Asynchronous-DSL or Synchronous-DSL Referring to the drawings, FIG. 1 is a block diagram of an example system 100 that can recover and maintain connectivity between a radio network subsystem(s) (RNS(s)) and an Internet Protocol (IP) Multimedia Subsystem (IMS) core network during disruption of connectivity of an associated PS core network in a communication network in accordance with an embodiment of the disclosed subject matter. In an aspect, example system 100 can include a desired number of UEs (e.g., mobile and/or wireless communication device, such as a mobile phone (e.g., 3GPP UMTS phone), personal digital assistant (PDA), computer, IP television (IPTV), gaming console, set-top box, printer, etc.), including UE 102, UE 104, UE 106, and UE 108, in a communication environment. The UEs 102, 104, 106, and 108 can be located in a wireless portion (e.g., region) of the communication network, for example. Each of the UEs 102, 104, 106, and 108 can be connected (e.g., wirelessly connected) to respective base stations, such as base stations 110, 112, 114, and 116, that serve respective coverage areas to facilitate communication in the wireless communication environment. Each of the base stations 110, 112, 114, and 116 can serve a respective coverage macro cell that can cover a specified area, and each of the base stations 110, 112, 114, and 116 can service mobile wireless devices, such as UEs 102, 104, 106, and 108, located in the respective area covered by the macro cell, where such coverage can be achieved via a wireless link (e.g., uplink (UL), downlink (DL)). When an attachment attempt is successful, a UE (e.g., 102) can be served by a base station (e.g., 110) and incoming voice and data traffic can be paged and routed to the UE through the base station, and outgoing voice and data traffic from the UE can be paged and routed through the base station to other communication devices (e.g., another UE). In an aspect, the respective UEs 102, 104, 106, and 108 can be connected and can communicate wirelessly, respectively, using virtually any desired wireless technology, including, for example, cellular, Wi-Fi, Wi-Max, wireless local area networks (WLAN), etc. It is to be appreciated and understood that, while FIG. 1 depicts four UEs being respectively served by four base stations, the subject innovation is not so limited, as, in accordance with the subject innovation, a base station can serve one or more UEs at a given time.

In an aspect, the base stations 110 and 112 can be part of RNS 118 and base stations 114 and 116 can be part of RNS 120, where RNS 118 can include an RNC 122, which can be associated with base stations 110 and 112, and RNS 120 can include an RNC 124, which can be associated with base stations 114 and 116. Each of the RNCs 122 and 124 can control the respective base stations (e.g., 110, 112, 114, 116) connected to such RNC. Each of the RNCs 122 and 124 also can provide radio resource management, manage packet scheduling, control handovers of a UE from one base station to another base station, provide desired security functions, data encryption, as well as provide other desired functions.

In another aspect, the RNSs 118 and 120 can be associated with (e.g., connected to) a PS core network 126 that can facilitate routing data between communication devices, such as the UEs (e.g., 102, 104, 106, 108), allocating resources to the UEs in the network, converting or enforcing protocols, establishing and enforcing Quality of Service (QoS) for the UEs, providing applications or services in the network, translating signals, and/or performing other functions to facilitate system interoperability and communication in the wireless communication network. The PS core network 126 can include a serving support node, such as a serving GPRS support node (SGSN) 128, which can be associated with the RNCs 122 and 124 to facilitate communication of data, in accordance with specified protocols, between the RNSs 118 and 120 and the PS core network 126. The PS core network 126 also can contain a gateway node, such as a gateway GPRS support node (GGSN) 130, which can facilitate communication of data between the PS core network 126 and an IMS core network 132 associated therewith. The PS core network 126 also can comprise other components, such as routers, nodes, switches, interfaces, controllers, etc., that can facilitate communication of data between communication devices in the communication network.

In an aspect, the IMS core network 132 can provide IP multimedia services and other desired data services, for example, to communication devices (e.g., UEs) associated with the communication network. The IMS core network 132 also can be associated with communication devices, including UEs (e.g., 102, 104, 106, 108) and/or other communication devices (e.g., servers, computers, etc. (not shown)), that can be connected to the IMS core network 132 via a wired or wireless connection. In accordance with an aspect, the IMS core network 132 can comprise a Call State Control Function (CSCF) 134 that can perform various communication-related functions, such as inspecting data traffic (e.g., messages), authenticating users, establishing IPsec security association with an IMS terminal, compress or decompress messages, establishing or authorizing Quality of Service (QoS) (e.g., employing a Policy Decision Function (PDF), generating charging records, performing session control for a communication session between communication devices, routing of data traffic between communication devices, enforcing policy in accordance with the network, etc. The CSCF 134 can be associated with the Media Gateway Control Function (MGCF) 136 that can facilitate controlling a Media Gateway (MGW) 138, which can be connected to the MGCF 136, where the MGCF 136 and MGW 138 also can be part of the IMS core network 132. The MGCF 136 also can facilitate managing communication between its domain and an Integrated Services Digital Network (ISDN) 140 and a Public-Switched Telephone Network (PSTN) 142 associated therewith via the MGW 138.

The example system 100 also can comprise a Mobile Switching Center (MSC) 144 that can be associated with the SGSN 128, GGSN 130, and CSCF 134, and can facilitate performing various functions, such as, for example, switching functions for the network, registration and authentication associated with communication devices in the network, routing of data traffic or calls, updating of locations, handovers of communication devices, etc.

In a conventional communication network, in certain instances (e.g., breakdown in the PS core network, disaster situation where connectivity with the PS core network is lost or disrupted, etc.), there can be a disruption or loss of connectivity between a PS core network and an IMS core network, and/or between an RNS and the PS core network, which can result in loss of communications between a communication device(s) associated with the RNS and the IMS core network. In such instances when there is a disruption or loss of connectivity with the PS core network, it is desirable to be able to recover and maintain communications between communication devices in the communication network.

In contrast to conventional systems and techniques, the subject innovation can enable recovery of communications with a core network, such as an IMS core network 132 (e.g., in a UMTS, in a GSM), to access the IMS core network 132 (e.g., IMS Voice-over-IP (VoIP) core network), during a disruption of access or service associated with the PS core network 126. When a disruption of access to the PS core network 126 is detected, the subject innovation automatically or dynamically can re-route data traffic or calls to the IMS core network 132 via a wireless or wired interface directly from an RNC(s) (e.g., 122, 124) to the IMS core network 132 (e.g., IMS VoIP backbone network), in accordance with predefined routing criteria. The subject innovation can facilitate ensuring that UEs (e.g., 102, 104, 106, 108) and users of such UEs are not affected during a disruption of access or service associated with the PS core network 126, for example, during a disaster. As a result, the subject innovation can facilitate restoring communications between UEs and the IMS core network 132 without affecting or substantially without affecting the users. As further result, the subject innovation can provide many benefits over conventional systems and methods of communication, where such benefits include, for example, continued user service in the communication network; prevent or reduce revenue loss by network operators; provide improved or higher customer satisfaction; provide improved mean time to recovery (MTTR); provide a market differentiator; maintain high reliability; and/or provide an improved fault tolerant and diverged network—over conventional communication systems.

In accordance with various aspects and embodiments, the example system 100 can comprise a service recovery controller component (SRCC) 146 that can monitor connectivity (e.g., monitor connectivity status) in the communication network, including connectivity between an RNS (e.g., 118, 120) and the PS core network 126 (e.g., SGSN 128 in the PS core network 126), connectivity between the PS core network 126 and the IMS core network 132 (e.g., between the GGSN 130 in the PS core network 126 and the CSCF 134 or the MGW 138 in the IMS core network 132), and/or connectivity at other points in the communication network, and can detect a disruption or loss of connectivity associated with a core network, such as the PS core network 126. When a disruption or loss of connectivity associated with the PS core network 126 is detected and/or determined by the SRCC 146, the SRCC 146 can automatically and/or dynamically re-route data or voice traffic between a RNC(s), such as RNC 122 and/or RNC 124, associated with a RAN (e.g., UTRAN), and the IMS core network 132 via a direct interface(s), and an alternate communication path, based at least in part on the predefined routing criteria, to enable communications to continue between communication devices (e.g., between servers or other communication devices associated with the IMS core network 132 and the UEs (e.g., 102, 104, 106, 108)).

Determination of whether there is a loss of connectivity associated with the PS core network 126 can be based at least in part on the predefined routing criteria. For example, as desired, the predefined routing criteria can provide that any loss of connectivity associated with the PS core network 126 can trigger re-routing of the data or voice traffic via a direct interface between an RNS(s) (e.g., 118, 120) and IMS core network 132, bypassing the PS core network 126; or, as desired, the predefined routing criteria can specify that data or voice traffic is to be re-routed via a direct interface between an RNS(s) and the IMS core network 132 if there is a disruption or loss of connectivity associated with the PS core network 126 that lasts at least a predefined minimum amount of time, but the data or voice traffic is not re-routed via the direct interface if the disruption or loss of connectivity associated with the PS core network 126 has not continued for at least the predefined minimum amount of time.

In an aspect, RNC 122 can comprise an interface component 148 (also referred to as "I/F Comp. 148") and CSCF 134 can comprise an interface component 150 (also referred to as "I/F Comp. 150") that can be associated with each other (e.g., connected via a wired or wireless connection—as illustrated with a "dotted line" in FIG. 1 to signify that such connection is an alternate communication path to the communication path between the RNC 122 and CSCF 134 via the PS core network 126) to facilitate direct connectivity between the RNC 122 and the CSCF 134, so that there can be a wireless or wired direct interface, and an alternate communication path, between RNC 122 and the CSCF 134, which is in the IMS core network 132, to facilitate bypassing the PS core network 126; and/or RNC 124 can comprise an interface component 152 (also referred to as "I/F Comp. 152") and MGW 138 can comprise an interface component 154 (also referred to as "I/F Comp. 154") that can be associated with each other (e.g., connected via a wired or wireless connection—as illustrated with a "dotted line" in FIG. 1 to signify that such connection is an alternate communication path to the communication path between the RNC 124 and MGW 138 via the PS core network 126)) to facilitate direct connectivity between the RNC 124 and the MGW 138, so there can be a wireless or wired direct interface, and an alternate communication path, between RNC 124 and the MGW 138, which is in the IMS core network 132, to facilitate bypassing the PS core network 126. In another aspect, the SRCC 146 can continue to monitor connectivity status in the communication network, and can detect when connectivity associated with the PS core network 126 is re-established. When connectivity associated with the PS core network 126 is re-established, the SRCC 146 can again route data or voice traffic between the UEs (e.g., via respective RNCs 122 or 124) and the IMS core network 132 via the PS core network 126, instead of using the direct interface connections (e.g., interface components 148, 150, 152, 154).

In another aspect, the re-routing of data or voice traffic via a direct interface between an RNS (e.g., 118, 120) (and RNC (e.g., 122, 124) associated therewith) and the IMS core network 132 can be based at least in part on the type of traffic. For example, data traffic (e.g., data packets) can be routed between an RNC (e.g., 122) and the CSCF 134; and other traffic, such as voice traffic, can be routed between an RNC (e.g., 124) and the MGW 138. It is to be appreciated and understood that, while for purposes of brevity and clarity RNC 122 is depicted in FIG. 1 as only being interfaced with the CSCF 134 and RNC 124 is depicted in FIG. 1 as only being interface with the MGW 138, the subject innovation is not so limited, as an RNC, such as RNCs 122 and 124, can be directly interfaced with both the CSCF 134 and MGW 138 (and/or other components associated with the IMS core network 132) to facilitate communication of data traffic and/or voice traffic between that RNC and the IMS core network 132.

In an aspect, the predefined routing criteria can relate to one or more of the following: current connectivity status associated with the PS network 126, whether the traffic is data traffic or voice traffic (e.g., data traffic can be routed between an RNC (e.g., 122, 124) and CSCF 134 via a direct interface; voice traffic can be routed between an RNC (e.g., 122, 124) and MGW 138 via another direct interface), length of time that connectivity associated with the PS core network 126 has been lost or disrupted (e.g., the routing criteria can specify that data or voice traffic is to be re-routed via direct interface between an RNC (e.g., 122, 124) and the IMS core network 132 if there is a disruption or loss of connectivity associated with the PS core network 126 that lasts at least a predefined minimum amount of time, but do not re-route the data or voice traffic via the direct interface if the disruption or loss of connectivity has not continued for at least the predefined minimum amount of time), type of network or system (e.g., UTRAN, GSM, . . . ), and/or other desired routing criteria.

It is to be appreciated and understood that, although not shown in FIG. 1 for reasons of clarity and brevity, components of example system 100, such as RNCs 122 and 124, CSCF 134, and MGW 138, each can contain other components, including, for example a processor(s), controller(s), switch(es), router(s), node(s), data store(s), and/or other components.

It is to be further appreciated and understood that the subject innovation is depicted in FIG. 1 as having four UEs 102, 104, 106, 108; four base stations 110, 112, 114, 116; two RNSs 118, 120; two RNCs 122, 124; one PS core network 126; one SGSN 128; one GGSN 130; one IMS core network 132; one CSCF 134; one MGSF 136; one MGW 138; one MSC 144; and one SRCC 146; however, the subject innovation is not so limited, as there also can be less than or more than four UEs; less than or more than four base stations; less than or more than two RNSs; less than or more than two RNCs; more than one PS core network; more than one SGSN;

more than one GGSN; more than one IMS core network; more than one CSCF; more than one MGSF; more than one MGW; more than one MSC; and/or more than one SRCC, as desired. It is to be further appreciated and understood that, while the SRCC 146 is depicted as being a stand-alone unit, the subject innovation is not so limited, as, in accordance with various embodiments, the SRCC 146 can be a stand-alone unit, or can be part of another component in system 100, or portions (e.g., components) of the SRCC 146 can be distributed as separate components throughout the system 100, as desired.

In accordance with one embodiment of the subject innovation, one or more components (e.g., SRCC 146) in the communication network can utilize artificial intelligence (AI) methods to infer (e.g., reason and draw a conclusion based at least in part on a set of metrics, arguments, or known outcomes in controlled scenarios) whether connectivity associated with the PS core network 126 is disrupted; whether connectivity associated with the PS core network 126 is re-established after being disrupted; whether data or voice traffic is to be re-routed directly between an RNC and the CSCF and/or MGW via a direct interface that bypasses the PS core network 126; etc. Artificial intelligence techniques typically can apply advanced mathematical algorithms—e.g., decision trees, neural networks, regression analysis, principal component analysis (PCA) for feature and pattern extraction, cluster analysis, genetic algorithm, and reinforced learning—to historic and/or current data associated with system 100 (or another system(s) disclosed herein) to facilitate rendering an inference(s) related to the system 100 (or another system(s) disclosed herein).

In particular, the one or more components in the network can employ one of numerous methodologies for learning from data and then drawing inferences from the models so constructed, e.g., Hidden Markov Models (HMMs) and related prototypical dependency models. General probabilistic graphical models, such as Dempster-Shafer networks and Bayesian networks like those created by structure search using a Bayesian model score or approximation can also be utilized. In addition, linear classifiers, such as support vector machines (SVMs), non-linear classifiers like methods referred to as "neural network" methodologies, fuzzy logic methodologies can also be employed. Moreover, game theoretic models (e.g., game trees, game matrices, pure and mixed strategies, utility algorithms, Nash equilibria, evolutionary game theory, etc.) and other approaches that perform data fusion, etc., can be exploited in accordance with implementing various automated aspects described herein. The foregoing methods can be applied to analysis of the historic and/or current data associated with system 100 (or another system(s) disclosed herein) to facilitate making inferences or determinations related to system 100 (or another system(s) disclosed herein).

Figure 2:
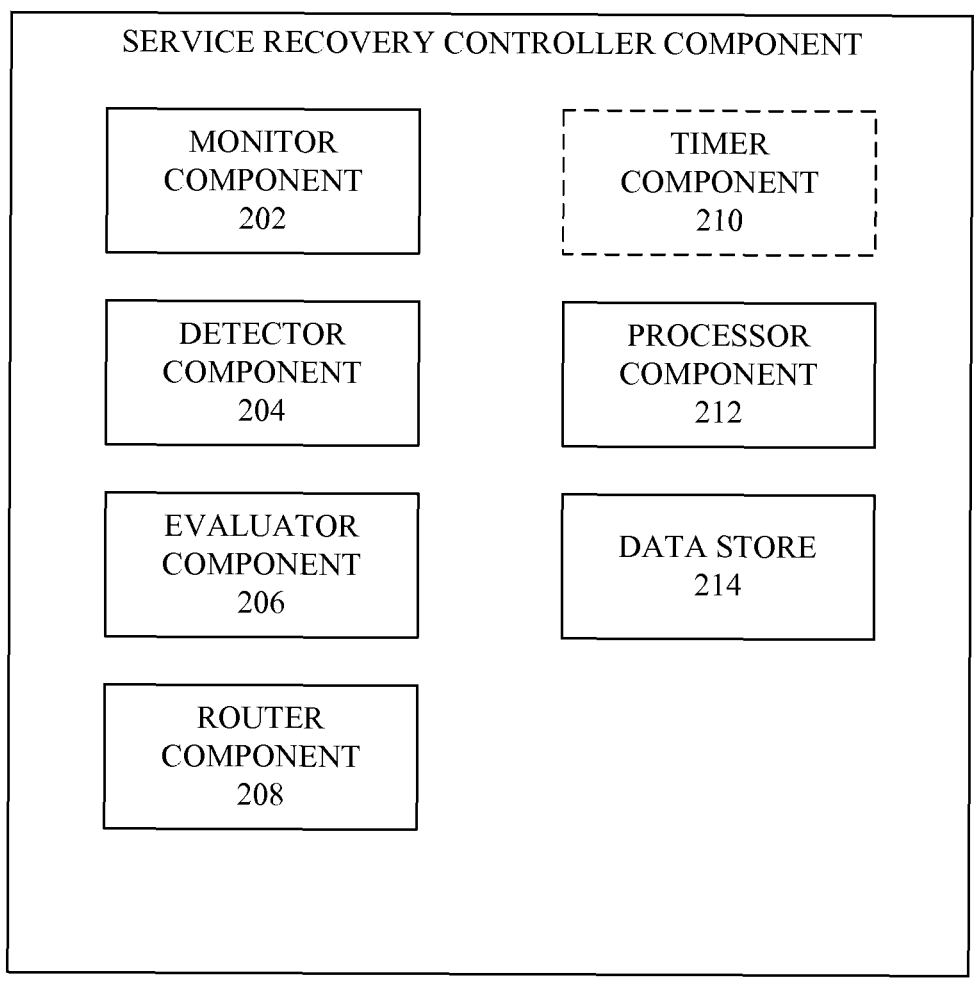
FIG. 2 is a block diagram of an example SRCC 200 in accordance with an aspect of the disclosed subject matter.

FIG. 2 depicts a block diagram of an example SRCC 200 in accordance with an aspect of the disclosed subject matter. In an aspect, the SRCC 200 can be utilized to recover and maintain connectivity between an RNS(s) and an IMS core network during disruption of connectivity of an associated PS core network in a communication network. In an aspect, the SRCC 200 can include a monitor component 202 that can monitor conditions relating to connectivity associated with a PS core network (e.g., connectivity conditions between the PS core network and the RNS(s) and/or between the PS core network and the IMS core network) to facilitate determining whether connectivity associated with the PS core network is disrupted.

In another aspect, the SRCC 200 also can include a detector component 204 that can detect whether connectivity associated with the PS core network is disrupted and/or whether connectivity associated with the PS core network is re-established after a disruption. The detector component 204 can operate in conjunction with an evaluator component 206 that can evaluate monitored conditions relating to connectivity associated with the PS core network to facilitate detecting or determining whether connectivity associated with the PS core network is disrupted and/or whether connectivity associated with the PS core network is re-established after a disruption.

In still another aspect, the SRCC 200 can comprise a router component 208 that can automatically or dynamically route (e.g., re-route) data or voice traffic (associated with a UE(s)) between the RNC(s) and the IMS core network based at least in part on current connectivity status associated with the PS core network. The router component 208 can generate routing control information that can be communicated to a desired router(s) (associated with a desired interface(s), such as a interface components 148, 150, 152, and/or 154, or an interface between an RNC and a SGSN or between a GGSN and a CSCF or MGW) to facilitate routing data or voice traffic to or towards a desired destination.

For example, if the current connectivity status, as determined by the detector component 204 (in conjunction with the evaluator component 206), associated with the PS core network indicates loss of connectivity (e.g., disruption of service or access) with the PS core network, the router component 208 can receive information regarding such current connectivity status, can generate routing information to route data or voice traffic via a direct interface between an RNC(s) and the CSCF and/or MGW, as opposed to routing the traffic via the PS core network, and the routing information can be communicated to the desired RNC(s) and CSCF and/or MGW, and/or other desired components (e.g., router(s)) to facilitate routing data or voice traffic via the direct interface (e.g., alternate communication path). When the detector component 204 (in conjunction with the evaluator component 206) determines that connectivity is re-established with the PS core network, the detector component 204 can send a signal to the router component 208 indicating that connectivity with the PS core network is established, and the router component 208 can generate routing information that can be communicated to the RNC(s) and CSCF and/or MGW to route data or voice traffic via the PS core network (e.g., via standard interfaces between the RNS and PS core network and between the PS core network and IMS core network).

In accordance with an embodiment, the SRCC 200 optionally can include a timer component 210 that can track the amount of time connectivity associated with a PS core network has been disrupted or lost to facilitate determining whether data or voice traffic is to be re-routed via a direct interface between an RNS and the IMS core network. For example, as desired, predefined routing criteria can specify that data or voice traffic is to be re-routed via a direct interface between an RNS and the IMS core network 132 if there is a disruption or loss of connectivity associated with the PS core network 126 that lasts at least a predefined minimum amount of time, but the data or voice traffic is not re-routed via the direct interface if the disruption or loss of connectivity associated with the PS core network 126 has not continued for at least the predefined minimum amount of time. The timer component 210 can track the amount of time that elapses during a disruption or loss of connectivity associated with the PS core network, and that time information can be utilized to make a determination regarding whether to dynamically re-route data or voice traffic via the direct interface between an RNS and the IMS core network, bypassing the PS core network. The timer component 210 can be re-set to a predefined re-set value when connectivity associated with the PS core network is re-established, and can remain at the re-set value until connectivity associated with the PS core network is disrupted or lost, where the timer component 210 can increment at a specified rate and amount to facilitate tracking the amount of time that connectivity associated with the PS core network has been disrupted or lost.

In yet another aspect, the SRCC 200 can comprise a processor component 212 that can work in conjunction with the other components (e.g., monitor component 202, detector component 204, evaluator component 206, router component 208, timer component 210, etc.) to facilitate performing the various functions of the SRCC 200. The processor component 212 can employ one or more processors, microprocessors, or controllers that can process data, such as information relating to connectivity status associated with the PS core network, routing information relating to routing data or voice traffic via a standard interface(s) (e.g., via standard interfaces between the RNS and PS core network and between the PS core network and IMS core network) or via a direct interface that bypasses the PS core network (e.g., via a direct interface between an RNC(s) and the CSCF and/or MGW), and/or other information, to facilitate maintaining connectivity and communications between the RNS(s) (and associated UEs) and the IMS core network, even when connectivity associated with the PS core network is lost; and can control data flow between the SRCC 200 and other components (e.g., monitor component 202, detector component 204, evaluator component 206, router component 208, timer component 210, etc.) associated with the SRCC 200.

The SRCC 200 also can include a data store 214 that can store data structures (e.g., user data, metadata); code structure(s) (e.g., modules, objects, classes, procedures) or instructions; information relating to connectivity status associated with the PS core network (e.g., monitored or received information regarding connectivity); routing information; predefined routing criteria; network or device information like policies and specifications, attachment protocols; code sequences for scrambling, spreading and pilot (e.g., reference signal(s)) transmission; frequency offsets; cell IDs; and so on. In an aspect, the processor component 212 can be functionally coupled (e.g., through a memory bus) to the data store 214 in order to store and retrieve information (e.g., information relating to connectivity status associated with the PS core network; routing information; predefined routing criteria; algorithms used to determine whether data or voice traffic is to be routed via a direct interface between an RNC(s) and a CSCF and/or MGW, or via a standard interface; algorithms used to generate routing information; etc.) desired to operate and/or confer functionality, at least in part, to monitor component 202, detector component 204, evaluator component 206, router component 208, (optional) timer component 210, and/or substantially any other operational aspects of the SRCC 200.

Figure 3:
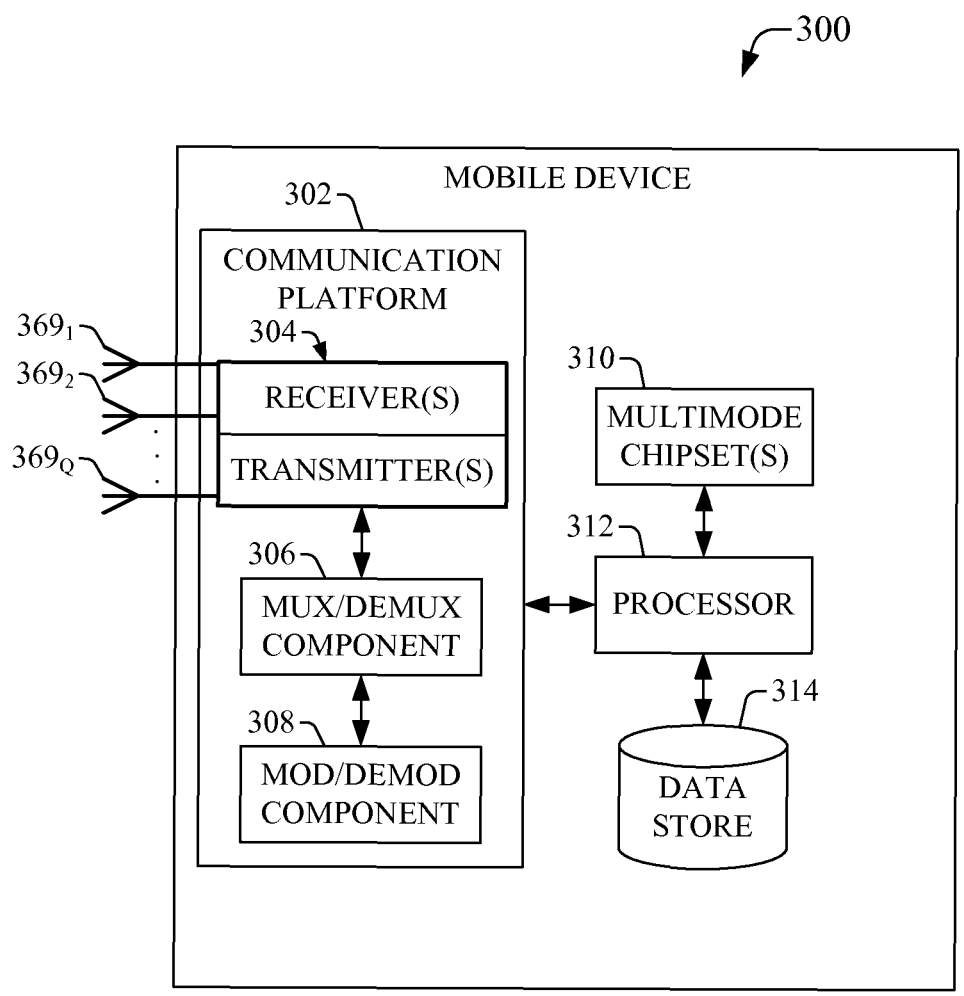
FIG. 3 depicts a block diagram of an example mobile device in accordance with an aspect of the disclosed subject matter.

FIG. 3 depicts a block diagram of an example mobile device 300 (e.g., UE) in accordance with an aspect of the disclosed subject matter. In an aspect, the mobile device 300 can be a multimode access terminal, wherein a set of antennas $369_1$-$369_Q$ (Q is a positive integer) can receive and transmit signal(s) from and to wireless devices like access points, access terminals, wireless ports and routers, and so forth, that operate in a radio access network. It should be appreciated that antennas $369_1$-$369_Q$ are a part of communication platform 302, which comprises electronic components and associated circuitry that provide for processing and manipulation of received signal(s) and signal(s) to be transmitted; e.g., receivers and transmitters 304, multiplexer/demultiplexer (mux/demux) component 306, and modulation/demodulation (mod/demod) component 308.

In another aspect, multimode operation chipset(s) 310 can allow the mobile device 300 to operate in multiple communication modes in accordance with disparate technical specification for wireless technologies. In an aspect, multimode operation chipset(s) 310 can utilize communication platform 302 in accordance with a specific mode of operation (e.g., voice, GPS). In another aspect, multimode operation chipset(s) 310 can be scheduled to operate concurrently (e.g., when Q>1) in various modes or within a multitask paradigm.

In still another aspect, the mobile device 300 also can include a processor(s) 312 that can be configured to confer functionality, at least in part, to substantially any electronic component within the mobile device 300, in accordance with aspects of the subject innovation. For example, the processor(s) 312 can facilitate enabling the mobile device 300 to process data (e.g., symbols, bits, or chips) for multiplexing/demultiplexing, modulation/demodulation, such as implementing direct and inverse fast Fourier transforms, selection of modulation rates, selection of data packet formats, inter-packet times, etc.

The mobile device 300 also can contain a data store 314 that can store data structures (e.g., user data, metadata); code structure(s) (e.g., modules, objects, classes, procedures) or instructions; network or device information like policies and specifications, attachment protocols; code sequences for scrambling, spreading and pilot (e.g., reference signal(s)) transmission; frequency offsets; cell IDs; encoding algorithms; compression algorithms; decoding algorithms; decompression algorithms; and so on. In an aspect, the processor(s) 312 can be functionally coupled (e.g., through a memory bus) to the data store 314 in order to store and retrieve information (e.g., frequency offsets, desired algorithms, etc.) desired to operate and/or confer functionality, at least in part, to communication platform 302, multimode operation chipset(s) 310, and/or substantially any other operational aspects of the mobile device 300.

Figure 4:
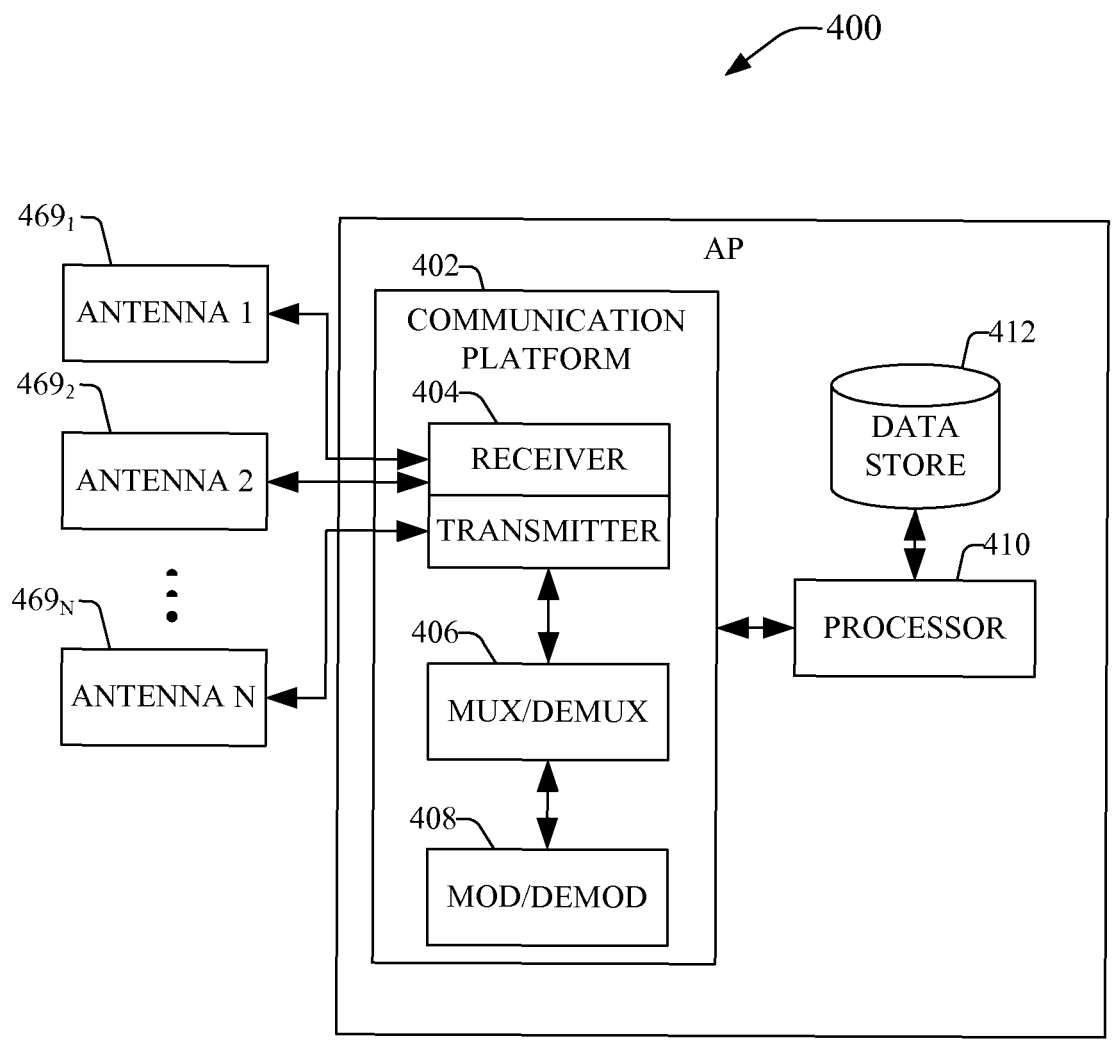
FIG. 4 illustrates a block diagram of an example access point (AP) in accordance with an aspect of the disclosed subject matter.

FIG. 4 illustrates a block diagram of an example AP 400 (e.g., base station) in accordance with an aspect of the disclosed subject matter. The AP 400 can receive and transmit signal(s) from and to wireless devices like access points (e.g., base stations, femto APs, pico APs), access terminals (e.g., UEs), wireless ports and routers, and the like, through a set of antennas $469_1$-$469_N$. In an aspect, the antennas $469_1$-$469_N$ are a part of a communication platform 402, which comprises electronic components and associated circuitry that can provide for processing and manipulation of received signal(s) and signal(s) to be transmitted. In an aspect, the communication platform 402 can include a receiver/transmitter 404 that can convert signal from analog to digital upon reception, and from digital to analog upon transmission. In addition, receiver/transmitter 404 can divide a single data stream into multiple, parallel data streams, or perform the reciprocal operation.

In an aspect, coupled to receiver/transmitter 404 can be a multiplexer/demultiplexer (mux/demux) 406 that can facilitate manipulation of signal in time and frequency space. The mux/demux 406 can multiplex information (e.g., data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, mux/demux component 406 can scramble and spread information (e.g., codes) according to substantially any code known in the art, e.g., Hadamard-Walsh codes, Baker codes, Kasami codes, polyphase codes, and so on. A modulator/demodulator (mod/demod) 408 also can be part of the communication platform 402, and can modulate information according to multiple modulation techniques, such as frequency modulation, amplitude modulation (e.g., M-ary quadrature amplitude modulation (QAM), with M a positive integer), phase-shift keying (PSK), and the like.

The AP 400 also can comprise a processor(s) 410 that can be configured to confer and/or facilitate providing functionality, at least partially, to substantially any electronic component in or associated with the AP 400. For instance, the processor(s) 410 can facilitate operations on data (e.g., symbols, bits, or chips) for multiplexing/demultiplexing, modulation/demodulation, such as effecting direct and inverse fast Fourier transforms, selection of modulation rates, selection of data packet formats, inter-packet times, etc.

In another aspect, the AP 400 can include a data store 412 that can store data structures; code instructions; rate coding information associated with a served access terminal; system or device information like policies and specifications; code sequences for scrambling; spreading and pilot transmission; floor plan configuration; access point deployment and frequency plans; scheduling policies; and so on. The processor(s) 410 can be coupled to the data store 412 in order to store and retrieve information (e.g., information, such as algorithms, relating to multiplexing/demultiplexing or modulation/demodulation, etc.) desired to operate and/or confer functionality to the communication platform 402, and/or other operational components of AP 400.

Figure 5:
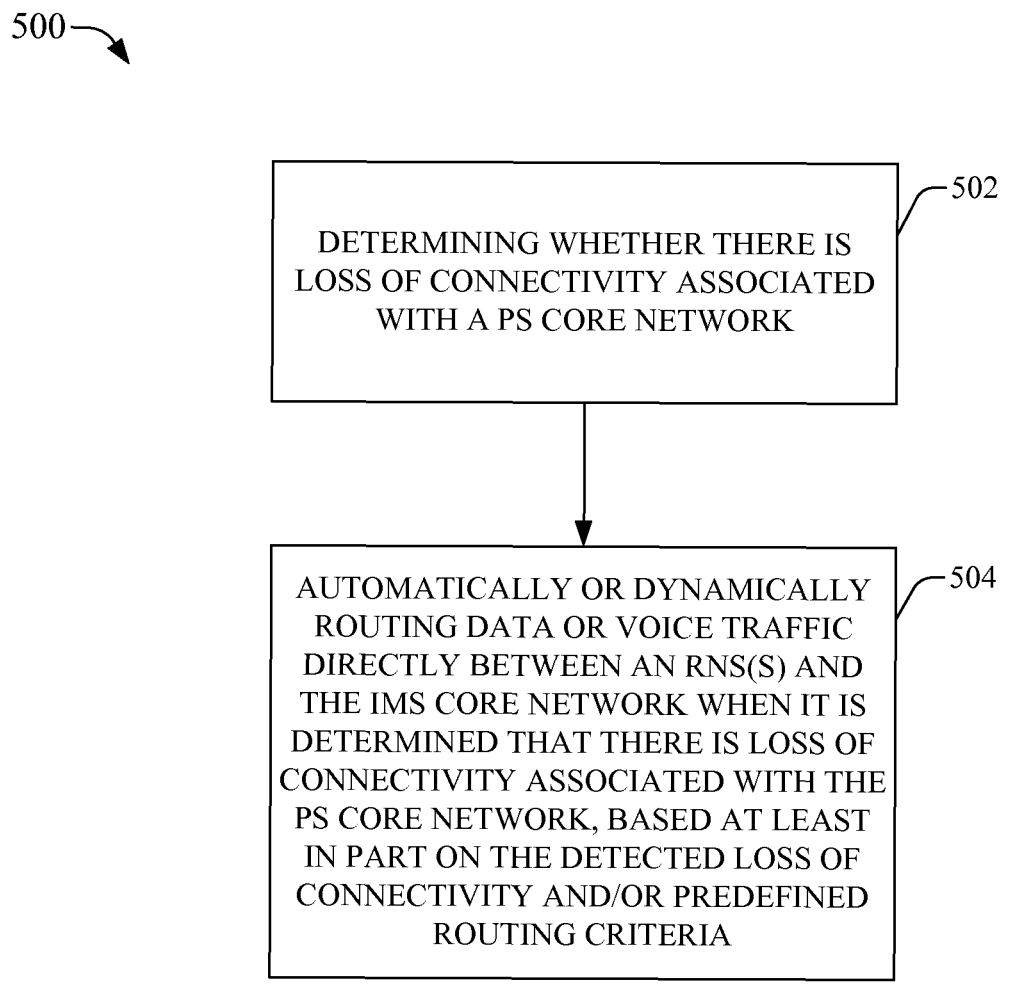
FIG. 5 illustrates a flowchart of an example methodology for automatically or dynamically routing data or voice traffic associated with a communication device to recover or maintain connectivity with an IMS core network in a communication network in accordance with various aspects of the disclosed subject matter.
Figure 6:
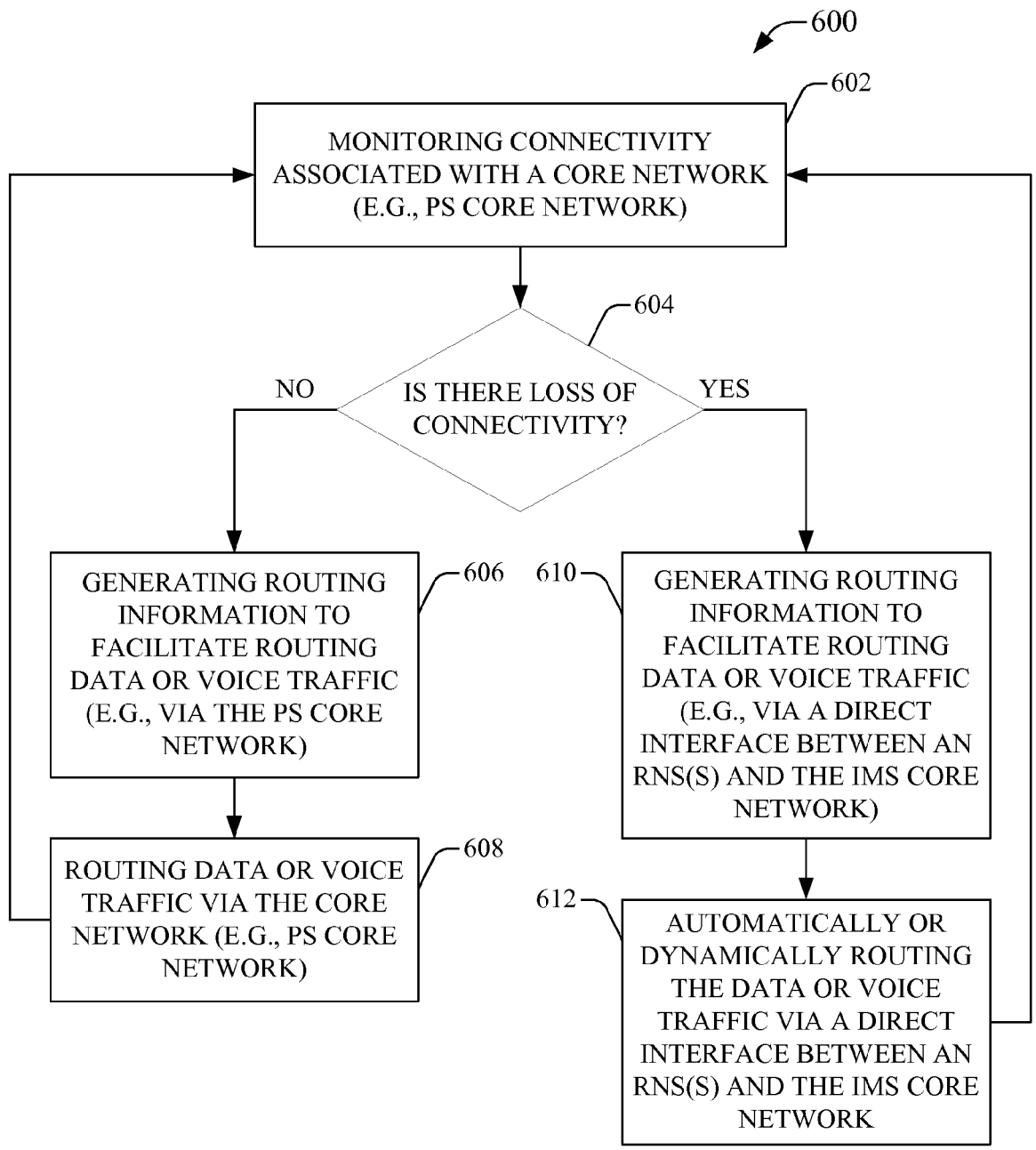
FIG. 6 depicts a flowchart of an example methodology that can automatically or dynamically route data or voice traffic associated with a communication device to recover or maintain connectivity with an IMS core network in a communication network in accordance with an aspect of the disclosed subject matter.
Figure 7:
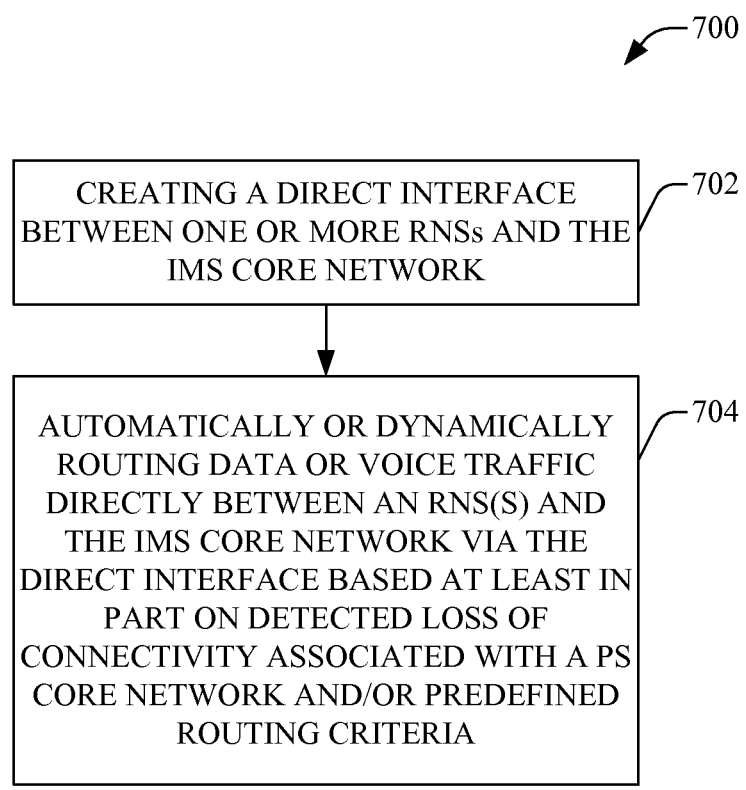
FIG. 7 illustrates a flowchart of an example methodology that can create a direct interface between an RNS and an IMS core network to facilitate recovering and/or maintaining data or voice communications in a communication network in accordance with an aspect of the disclosed subject matter.

In view of the example systems described herein, example methodologies that can be implemented in accordance with the disclosed subject matter can be better appreciated with reference to flowcharts in FIGS. 5-7. For purposes of simplicity of explanation, example methodologies disclosed herein are presented and described as a series of acts; however, it is to be understood and appreciated that the claimed subject matter is not limited by the order of acts, as some acts may occur in different orders and/or concurrently with other acts from that shown and described herein. For example, a methodology disclosed herein could alternatively be represented as a series of interrelated states or events, such as in a state diagram. Moreover, interaction diagram(s) may represent methodologies in accordance with the disclosed subject matter when disparate entities enact disparate portions of the methodologies. Furthermore, not all illustrated acts may be required to implement a methodology in accordance with the subject specification. It should be further appreciated that the methodologies disclosed throughout the subject specification are capable of being stored on an article of manufacture to facilitate transporting and transferring such methodologies to computers for execution by a processor or for storage in a memory.

FIG. 5 presents a flowchart of an example methodology 500 for automatically or dynamically routing data or voice traffic associated with a communication device (e.g., UE) to recover or maintain connectivity with an IMS core network in a communication network in accordance with various aspects of the disclosed subject matter. At 502, it can be determined whether there is loss of connectivity associated with a PS core network. In an aspect, an SRCC (e.g., 146) can monitor connectivity conditions associated with a communication network, which can comprise, for example, a PS core network and IMS core network, where UEs in the communication network can communicate with the IMS core network as well as other communication devices (e.g., UEs). The UEs can be associated with the PS core network and IMS core network via an RNS, which can comprise one or more base stations respectively associated with one or more RNCs. The SRCC can evaluate information relating to the connectivity conditions associated with the PS core network to facilitate determining whether there is loss of connectivity associated with the PS core network, and can detect loss of connectivity associated with the PS core network when such loss of connectivity occurs, where the loss of connectivity can be, for example, between an RNS(s) and the PS core network and/or between the PS core network and IMS core network.

At 504, data or voice traffic can be automatically or dynamically routed directly between an RNS(s) and the IMS core network (e.g., via a direct interface(s) between the RNS(s) and the IMS core network) when it is determined that there is loss of connectivity associated with the PS core network based at least in part on the detected loss of connectivity and/or predefined routing criteria. In an aspect, the SRCC can route data or voice traffic directly between the RNS(s) (e.g., an RNC(s) of the RNS(s)) and IMS core network (e.g., CSCF and/or MGW of the IMS core network) via a direct wired or wireless interface (e.g., interface components 148 and 150 and/or interface components 152 and 154) when loss of connectivity associated with the PS core network is detected, in accordance with the predefined routing criteria, to facilitate recovering and/or maintaining communication between the UEs and IMS core network, even when there is service or access disruption associated with the PS core network. When connectivity is re-established with the PS core network, the SRCC can facilitate routing data or voice traffic associated with UEs and IMS core network via the PS core network, instead of via the direct interface(s).

FIG. 6 depicts a flowchart of an example methodology 600 that can automatically or dynamically route data or voice traffic associated with a communication device (e.g., UE) to recover or maintain connectivity with an IMS core network in a communication network in accordance with an aspect of the disclosed subject matter. At 602, connectivity associated with a core network, such as a PS core network, can be monitored. In an aspect, an SRCC (e.g., 146) can monitor connectivity and/or communications associated with the PS core network. The PS core network can be part of a communication network that also can comprise one or more UEs that communicate with an IMS core network via the PS core network and one or more RNSs, which can respectively include one or more base stations respectively associated with one or more RNCs.

At 604, a determination can be made regarding whether loss of connectivity associated with the core network (e.g., PS core network) has occurred. In accordance with one aspect, the SRCC can monitor, detect, and/or receive information relating to connectivity associated with the PS core network and can evaluate such information to determine whether there is a loss of connectivity associated with the PS core network (e.g., loss of connectivity between an RNC(s) and the PS core network and/or between the PS core network and IMS core network).

If it is determined that there is not loss of connectivity associated with the PS core network (or if the loss of connectivity has not occurred for at least a predefined minimum amount of time, if and when such routing criteria is employed), at 606, routing information can be generated to facilitate routing data or voice traffic, for example, via the PS core network, in accordance with the predefined routing criteria. At 608, the data or voice traffic can be routed via the PS core network. In an aspect, the data or voice traffic can be routed between a UE(s) (via an associated RNS(s)) and the IMS core network via the PS core network (e.g., via standard interfaces between the RNS(s) and the PS core network and between the PS core network and IMS core network). At this point, methodology 600 can return to reference numeral 602, where connectivity associated with the core network, such as the PS core network, can continue to be monitored.

If, at 604, it is determined that there is loss of connectivity associated with the PS core network (or if the loss of connectivity has occurred for at least a predefined minimum amount of time, if and when such routing criteria is employed), at 610, routing information can be generated to facilitate routing data or voice traffic, for example, via a direct interface between an RNS(s) and the IMS core network, in accordance with the predefined routing criteria. In an aspect, the SRCC can generate such routing information so that the data or voice traffic associated with a UE(s) can be routed via an alternate and direct communication path between an RNS(s) associated with the UE(s) and the IMS core network, thereby bypassing the PS core network, which is currently experiencing loss of connectivity with the RNS(s) and/or the IMS core network. At 612, the data or voice traffic can be automatically or dynamically routed via a direct interface between an RNS(s) and the IMS core network. At this point, methodology 600 can return to reference numeral 602, where connectivity associated with the core network, such as the PS core network, can continue to be monitored. For example, methodology 600 can continue to monitor connectivity associated with the PS core network to facilitate determining whether connectivity associated with the PS core network is re-established or whether there continues to be loss of connectivity associated with the PS core network.

FIG. 7 illustrates a flowchart of an example methodology 700 that can create a direct interface between an RNS and an IMS core network to facilitate recovering and/or maintaining data or voice communications in a communication network in accordance with an aspect of the disclosed subject matter. At 702, a direct interface between one or more RNSs and the IMS core network can be created. In an aspect, each RNC respectively associated with the RNSs can comprise an interface component, and a CSCF and MGW associated with the IMS core network each can contain an interface component. The interface component associated with an RNC can be wired or wirelessly connected to the CSCF and/or MGW so that there is a direct communication path (e.g., direct interface) between the RNS, comprising the RNC, and the IMS core network, comprising the CSCF and MGW.

At 704, data or voice traffic can be automatically or dynamically routed directly between an RNS(s) and the IMS core network via the direct interface based at least in part on detected loss of connectivity associated with a PS core network and/or predefined routing criteria. In an aspect, the SRCC can route data or voice traffic directly between the RNS(s) (e.g., the RNC(s) of respective RNS(s)) and IMS core network (e.g., CSCF and/or MGW of the IMS core network) via a direct wired or wireless interface (e.g., interface components 148 and 150 and/or interface components 152 and 154) when loss of connectivity associated with the PS core network is detected, in accordance with predefined routing criteria. Routing the data or voice traffic via the direct interface can facilitate recovering and/or maintaining communication between UEs and the IMS core network, even when there is service or access disruption associated with the PS core network.

It also is to be appreciated and understood that components (e.g., UE, base station, RNS, RNC, SRCC, PS core network, IMS core network, SGSN, GGSN, CSCF, MGCF, MGW, MSC, interface component, etc.), as described with regard to a particular system or methodology, can include the same or similar functionality as respective components (e.g., respectively named components) as described with regard to other systems or methodologies disclosed herein.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," data storage," "database," and substantially any other information storage component relevant to operation and functionality of a component, refer to "memory components," or entities embodied in a "memory" or components comprising the memory. For example, information relevant to operation of various components described in the disclosed subject matter, and that can be stored in a memory, can comprise, but is not limited to comprising, subscriber information; cell configuration (e.g., devices served by an AP) or service policies and specifications; privacy policies; and so forth. It will be appreciated that the memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), phase change memory (PCM), flash memory, or nonvolatile RAM (e.g., ferroelectric RAM (FeRAM). Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD), Blu-ray disc (BD), . . . ), smart cards, and flash memory devices (e.g., card, stick, key drive . . . ).

What has been described above includes examples of systems and methods that provide advantages of the subject innovation. It is, of course, not possible to describe every conceivable combination of components or methodologies for purposes of describing the claimed subject matter, but one of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
   memory storing computer-executable instructions;
   processor, communicatively coupled to the memory, that facilitates execution of the computer-executable instructions to at least:
   facilitate communication of traffic associated with a communication device between a radio network subsystem and an Internet protocol multimedia system network via a packet-switched network;
   route the traffic associated with the communication device via a direct interface between the radio network subsystem and the Internet protocol multimedia system network in response to detection of loss of connectivity between the packet-switched network and the Internet protocol multimedia system network, in accordance with a predefined routing criterion;
   monitor a connectivity status associated with the packet-switched network at least while the traffic associated with the communication device is being routed via the direct interface between the radio network subsystem and the Internet protocol multimedia system network; and
   in response to detection of the connectivity between the packet-switched network and the Internet protocol multimedia system network being re-established, re-route at least a portion of the traffic associated with the communication device from being communicated between the radio network subsystem and the Internet protocol multimedia system network via the direct interface to communicate at least the portion of the traffic associated with the communication device between the radio network subsystem and the Internet protocol multimedia system network via the packet-switched network.

2. The system of claim 1, wherein the radio network subsystem comprises a radio network controller that includes a first interface, the Internet protocol multimedia system network comprises a call state control function that includes a second interface, and the first interface is directly connected to the second interface to form at least a portion of the direct interface.

3. The system of claim 2, wherein the processor further facilitates the execution of the computer-executable instructions to route data traffic associated with the communication device via the direct interface between the first interface and the second interface in response to the detection of the loss of connectivity.

4. The system of claim 2, wherein the Internet protocol multimedia system network comprises a media gateway that includes a third interface directly connected to the first interface to faun at least another portion of the direct interface, wherein the processor further facilitates the execution of the computer-executable instructions to route voice traffic associated with the communication device between the first interface and the third interface.

5. The system of claim 1, wherein the loss of connectivity comprises another loss of connectivity between the radio network subsystem and the packet-switched network.

6. The system of claim 1, wherein the processor further facilitates the execution of the computer-executable instructions to become associated with the radio network subsystem, the packet-switched network, and the Internet protocol multimedia system network, and monitor status of connectivity associated with the packet-switched network.

7. The system of claim 6, wherein the processor further facilitates the execution of the computer-executable instructions to generate routing information to facilitate routing of the traffic based on the monitored status of connectivity associated with the packet-switched network.

8. The system of claim 7, wherein the processor further facilitates the execution of the computer-executable instructions to transmit the routing information to the radio network subsystem, wherein the routing information directs the radio network subsystem to route the traffic directly between the radio network subsystem and the Internet protocol multimedia system network and bypass the packet-switched network in response to the loss of connectivity.

9. The system of claim 1, wherein the processor further facilitates the execution of the computer-executable instructions to route the traffic via the packet-switched network in response to a determination that the connectivity associated with the packet-switched network is acceptable in accordance with the predefined routing criterion.

10. The system of claim 1, wherein, in response to the detection of the loss of connectivity, the processor further facilitates the execution of the computer-executable instructions to track an amount of time that the loss of connectivity exists, and only route the traffic associated with the communication device via the direct interface between the radio network subsystem and the Internet protocol multimedia system network in response to a determination that the loss of connectivity has continued for a predefined amount of time, in accordance with the predefined routing criterion.

11. The system of claim 1, wherein the predefined routing criterion relates to length of time that connectivity associated with the packet-switched network has been lost.

12. The system of claim 1, wherein the communication device is a computing device comprising voice and data communication functionality.

13. A method, comprising:
    determining, by a system including processor, whether there is loss of connectivity associated with a packet-switched network;
    routing, by the system, communication traffic directly between a radio network subsystem, associated with a mobile communication device, and an Internet protocol multimedia system network in response to determining loss of connectivity associated with the packet-switched network based on a predefined routing criterion, wherein the loss of connectivity associated with the packet-switched network comprises loss of connectivity between the packet-switched network and the Internet protocol multimedia system network;
    monitoring a connectivity status associated with the packet-switched network at least while the communication traffic associated with the mobile communication device is being routed directly between the radio network subsystem and the Internet protocol multimedia system network; and
    in response to detecting that the connectivity between the packet-switched network and the Internet protocol multimedia system network is re-established, re-routing at least a portion of the communication traffic associated with the mobile communication device from being communicated directly between the radio network subsystem and the Internet protocol multimedia system network to communicate at least the portion of the communication traffic associated with the mobile communication device between the radio network subsystem and the Internet protocol multimedia system network via the packet-switched network.

14. The method of claim 13, further comprising:
monitoring, by the system, status of connectivity associated with the packet-switched network; and
detecting, by the system, the loss of connectivity associated with the packet-switched network.

15. The method of claim 14, the monitoring status of connectivity associated with the packet-switched network, further comprising:
monitoring status of connectivity between the radio network subsystem and the packet-switched network.

16. The method of claim 13, further comprising:
generating, by the system, routing data to route the communication traffic, wherein the content of the routing data is based on the determining of whether there is the loss of connectivity associated with the packet-switched network; and
transmitting, by the system, the routing data to the radio network subsystem in response to the determining that there is the loss of connectivity associated with the packet-switched network.

17. The method of claim 13, further comprising:
routing, by the system, the communication traffic via the packet-switched network in response to determining connectivity associated with the packet-switched network is established.

18. The method of claim 13, further comprising:
creating, by the system, a direct interface between the radio network subsystem and the Internet protocol multimedia system network that bypasses the packet-switched network to facilitate routing data traffic directly between the radio network subsystem and the Internet protocol multimedia system network.

19. A computer-readable storage device storing computer-executable instructions that, in response to execution, cause a system including a processor to perform operations, comprising:
determining whether there is loss of connectivity associated with a packet-switched network;
routing communication traffic directly between a radio network subsystem, associated with a mobile communication device, and an Internet protocol multimedia system network in response to determining there is loss of connectivity associated with the packet-switched network based on a predefined routing criterion, wherein the loss of connectivity associated with the packet-switched network comprises loss of connectivity between the packet-switched network and the Internet protocol multimedia system network;
monitoring a connectivity status associated with the packet-switched network at least while the communication traffic associated with the mobile communication device is being routed directly between the radio network subsystem and the Internet protocol multimedia system network; and
in response to detecting that the connectivity between the packet-switched network and the Internet protocol multimedia system network is re-established, re-routing at least a portion of the communication traffic associated with the mobile communication device from being communicated directly between the radio network subsystem and the Internet protocol multimedia system network to communicate at least the portion of the communication traffic associated with the mobile communication device between the radio network subsystem and the Internet protocol multimedia system network via the packet-switched network.

20. The computer-readable storage device of claim 19, the operations further comprising:
monitoring current status of connectivity associated with the packet-switched network; and
detecting the loss of connectivity associated with the packet-switched network.

* * * * *